United States Patent
Sakurai et al.

(10) Patent No.: US 12,368,219 B2
(45) Date of Patent: Jul. 22, 2025

(54) TERMINAL PART, METHOD FOR FABRICATING TERMINAL PART, AND SECONDARY BATTERY

(71) Applicant: Prime Planet Energy & Solutions, Inc., Tokyo (JP)

(72) Inventors: Takahiro Sakurai, Nagoya (JP); Kota Ohata, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 577 days.

(21) Appl. No.: 17/863,309

(22) Filed: Jul. 12, 2022

(65) Prior Publication Data
US 2023/0012474 A1    Jan. 19, 2023

(30) Foreign Application Priority Data
Jul. 14, 2021   (JP) .................... 2021-116378

(51) Int. Cl.
H01M 50/00  (2021.01)
H01M 50/562 (2021.01)
H01M 50/566 (2021.01)

(52) U.S. Cl.
CPC ....... *H01M 50/566* (2021.01); *H01M 50/562* (2021.01)

(58) Field of Classification Search
CPC .......................... H01M 50/566; H01M 50/562
See application file for complete search history.

(56) References Cited

FOREIGN PATENT DOCUMENTS

| JP | 2000263250 A | | 9/2000 | |
|---|---|---|---|---|
| JP | 2014086291 A | * | 5/2014 | ............. Y02P 70/50 |
| JP | 201987608 A | | 6/2019 | |
| JP | 202044538 A | | 3/2020 | |

OTHER PUBLICATIONS

Arishima et al, Square Secondary Battery and Battery Pack Using the Same, May 2014, See the Abstract. (Year: 2014).*

* cited by examiner

*Primary Examiner* — Anca Eoff
*Assistant Examiner* — Monique M Wills
(74) *Attorney, Agent, or Firm* — HAUPTMAN HAM, LLP

(57) ABSTRACT

A terminal part with enhanced joint strength of a joint portion between different metals is provided. A terminal part disclosed here includes a first metal and a second metal. A joint interface between the first metal and the second metal includes a first layer disposed at the second metal and containing a first intermetallic compound and a second layer disposed closer to the first metal than the first layer and containing a second intermetallic compound. In the second layer, the second intermetallic compound has grown in a dendritic pattern, and the first metal is present in a gap of the dendritic second intermetallic compound.

12 Claims, 12 Drawing Sheets

TERMINAL PART, METHOD FOR FABRICATING TERMINAL PART, AND SECONDARY BATTERY

CROSS REFERENCE TO RELATED APPLICATIONS

This application claims the benefit of priority to Japanese Patent Application No. 2021-116378 filed on Jul. 14, 2021. The entire contents of this application are hereby incorporated herein by reference.

BACKGROUND OF THE DISCLOSURE

1. Technical Field

The present disclosure relates to a terminal part, a method for fabricating the terminal part, and a secondary battery.

2. Background

Secondary batteries such as lithium ion secondary batteries and nickel-metal hydride batteries are currently widely used in various fields including vehicles and portable terminals. A secondary battery of this type generally includes an electrode body as a power generation element, and electrode terminals connected to poles of the electrode body. In terminal parts included in the electrode terminals, different metals, such as aluminium and copper, can be joined together in some cases. Regarding such a joint, JP2019-87608A and JP2020-44538A propose that an aluminium member and a copper member are joined to form a eutectic layer of aluminium and copper or a layer including an intermetallic compound between the aluminium member and the copper member.

SUMMARY OF THE INVENTION

In some operating environments or manufacturing environments, an external load such as an impact and vibrations can be applied to components (e.g., electric cell) of a secondary battery. Thus, a joint portion between different metals in a terminal part as described above preferably has a high joint strength.

A terminal part disclosed here includes a first metal of aluminium or an aluminium alloy and a second metal of copper or a copper alloy. A joint interface between the first metal and the second metal includes a first layer disposed at the second metal and containing a first intermetallic compound constituted by aluminium and copper, and a second layer disposed closer to the first metal than the first layer and containing a second intermetallic compound, the second intermetallic compound being different from the first intermetallic compound and constituted by aluminium and copper. In the second layer, the second intermetallic compound has grown in a dendritic pattern, and aluminium or an aluminium alloy constituting the first metal is present in a gap of the second intermetallic compound having the dendritic pattern. In this terminal part, since the first metal is present in a gap of the dendritic second intermetallic compound, a joint portion between different metals has an increased joint strength.

A content of aluminium in the second intermetallic compound may be larger than a content of aluminium in the first intermetallic compound.

A thickness of the second layer may be larger than a thickness of the first layer.

Supposing the thickness of the first layer is 1, the thickness of the second layer may be 1 or more and 5 or less.

The second intermetallic compound may be $CuAl_2$.

The first intermetallic compound may be $Cu_9Al_4$.

In a secondary battery including: an electrode body including a positive electrode and a negative electrode; a battery case configured to house the electrode body; a positive electrode terminal attached to the positive electrode; and a negative electrode terminal attached to the negative electrode, at least one of the positive electrode terminal or the negative electrode terminal may include the terminal part described above. In this secondary battery, since the first metal is present in a gap of the dendric second intermetallic compound in the terminal part of the secondary battery, the joint portion between different metals has an increased joint strength.

A method for fabricating a terminal part disclosed here includes: a stacking step of stacking a first metal of aluminium or an aluminium alloy and a second metal of copper or a copper alloy a pressurizing step of applying a pressure to stacked portions of the first metal and the second metal; and an energizing step of energizing the first metal and the second metal under application of the pressure. Through the energizing step, two layers of a first layer disposed at the second metal and containing a first intermetallic compound constituted by aluminium and copper, and a second layer disposed closer to the first metal than the first layer and containing a second intermetallic compound, the second intermetallic compound being constituted by aluminium and copper and different from the first intermetallic compound, are formed at a joint interface between the first metal and the second metal. In the second layer, the second intermetallic compound has grown in a dendritic pattern, and aluminium or an aluminium alloy constituting the first metal is present in a gap of the second intermetallic compound having the dendritic pattern. With this fabrication method, since the first metal is present in a gap of the dendritic second intermetallic compound in the terminal part of the secondary battery, the secondary battery has an increased joint strength in a joint portion between different metals.

A content of aluminium in the second intermetallic compound may be larger than a content of aluminium in the first intermetallic compound.

The energizing step may include a first energizing step of causing a current Ia to flow and a second energizing step of causing a current Ib to flow. The current Ia may be smaller than the current Ib.

A total energization time in the energizing step may be 20 milliseconds or more and 200 milliseconds or less.

The pressure is 5 $N/mm^2$ or more and 30 $N/mm^2$ or less.

DETAILED DESCRIPTION OF THE PREFERRED EMBODIMENTS

Figure 1:
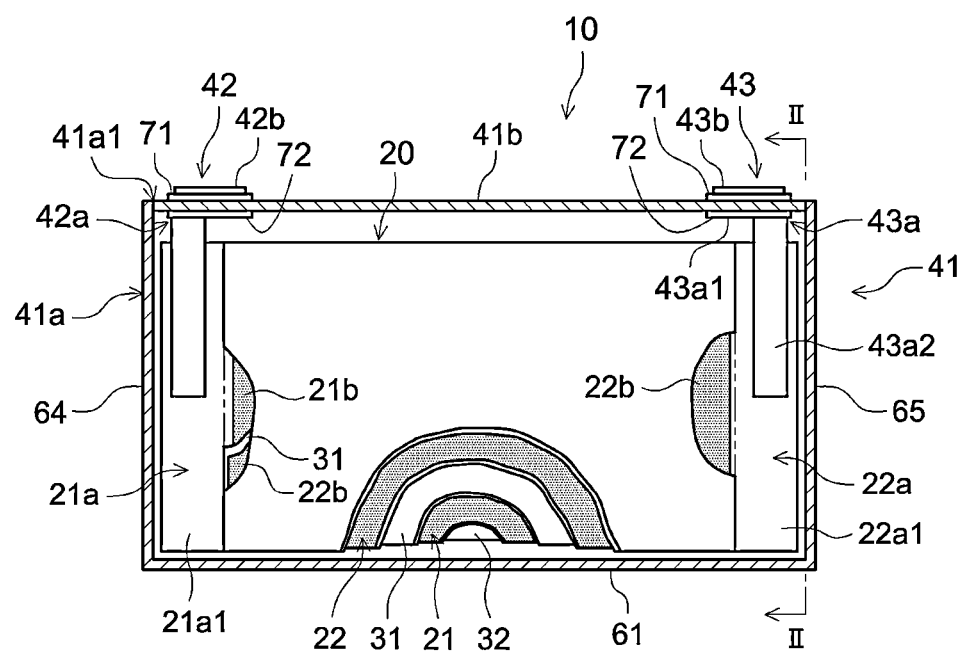
FIG. 1 is a partial cross-sectional view of a lithium ion secondary battery 10.

A technique disclosed here provides a joint body constituted by a first metal of aluminium or an aluminium alloy and a second metal of copper or a copper alloy, and a method for fabricating the joint body. As an example of the joint body, the following embodiment will be described using a terminal part for use in a secondary battery. One embodiment of a terminal part disclosed here, a method for fabricating the terminal part, and a secondary battery will be described hereinafter. An embodiment described here is, of course, not intended to particularly limit the present disclosure. The disclosure is not limited to the embodiment disclosed here unless otherwise specified. Each of the drawings is schematically drawn and does not necessarily reflect an actual object. Members and parts having the same functions are denoted by the same reference numerals as appropriate, and description for the same members and parts will not be repeated. An expression such as "A to B" indicating a numerical range means "A or more and B or less" and includes "more than A and less than B" unless otherwise specified.

A "secondary battery" herein generally refers to a power storage device in which charge/discharge reaction occurs by movement of charge carriers between a pair of electrodes (positive and negative electrodes) through an electrolyte. The secondary battery herein includes, for example, a capacitor such as an electric double layer capacitor as well as a so-called storage battery such as a lithium ion secondary battery, a nickel-metal hydride battery, and a nickel-cadmium battery. The following description is directed to an embodiment of a lithium ion secondary battery among the secondary batteries described above.

<Lithium Ion Secondary Battery 10>

Figure 2:
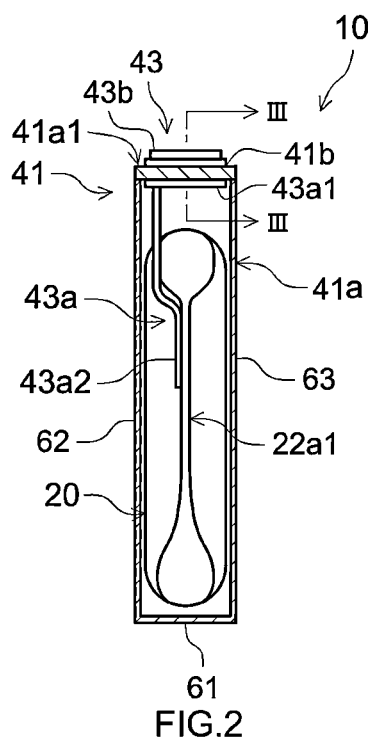
FIG. 2 is a cross-sectional view taken along line II-II in FIG. 1.

FIG. 1 is a partial cross-sectional view of a lithium ion secondary battery 10. FIG. 1 illustrates a state in which the inside of a substantially rectangular parallelepiped battery case 41 is exposed along a wide face thereof at one side. The lithium ion secondary battery 10 illustrated in FIG. 1 is a so-called sealed battery. FIG. 2 is a cross-sectional view taken along line II-II in FIG. 1. FIG. 2 schematically illustrates a partial cross section in a state where the inside of the substantially rectangular parallelepiped battery case 41 is exposed along a narrow face thereof at one side.

As illustrated in FIG. 1, the lithium ion secondary battery 10 includes an electrode body 20, the battery case 41, a positive electrode terminal 42, and a negative electrode terminal 43.

<Electrode Body 20>

The electrode body 20 is housed in the battery case 41 while being covered with, for example, an insulating film (not shown). The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long strip members.

The positive electrode sheet 21 includes a positive electrode current collector foil 21*a* (e.g., aluminium foil) having a predetermined width and a predetermined thickness, and a positive electrode active material layer 21*b* including a positive electrode active material and disposed on each surface of the positive electrode current collector foil 21*a* except for a non-formed portion 21*a*1 having a uniform width at one end on one side in the width direction. The positive electrode active material can release lithium ions during charging and absorb lithium ions during discharging in a manner similar to a lithium transition metal composite material in, for example, a lithium ion secondary battery. Various materials have been generally proposed for the positive electrode active material, as well as a lithium transition metal composite material, and the positive electrode active material is not limited to a specific material.

The negative electrode sheet 22 includes a negative electrode current collector foil 22*a* (copper foil in this embodiment) having a predetermined width and a predetermined thickness, and a negative electrode active material layer 22*b* including a negative electrode active material and disposed on each surface of the negative electrode current collector foil 22*a* except for a non-formed portion 22*a*1 having a uniform width at an edge on one side in the width direction. The negative electrode active material can store lithium ions during charging and release, during discharging, lithium ions stored during charging in a manner similar to natural graphite in, for example, a lithium ion secondary battery. Various materials have been generally proposed for the negative electrode active material, and the negative electrode active material is not limited to a specific material.

The separator sheets 31 and 32 are, for example, porous resin sheets through which an electrolyte having required heat resistance can pass. Various materials have also been proposed for the separator sheets 31 and 32, and the separator sheets 31 and 32 are not limited to a specific material.

In this embodiment, the width of the negative electrode active material layer 22*b* is wider than the positive electrode active material layer 21*b*, for example. The width of each of the separator sheets 31 and 32 is wider than the negative electrode active material layer 22*b*. The non-formed portion 21*a*1 of the positive electrode current collector foil 21*a* and the non-formed portion 22*a*1 of the negative electrode current collector foil 22*a* are disposed at opposite sides in the width direction. The positive electrode sheet 21, the first separator sheet 31, the negative electrode sheet 22, and the second separator sheet 32 are oriented in the length direction, and are sequentially stacked and wound together. The negative electrode active material layer 22*b* covers the positive electrode active material layer 21*b* with the separator sheets 31 and 32 interposed therebetween. The negative electrode active material layer 22*b* is covered with the separator sheets 31 and 32. The non-formed portion 21*a*1 of the positive electrode current collector foil 21*a* extends off from one side, in the width direction, of each of the separator sheets 31 and 32. The non-formed portion 22*a*1 of the negative electrode current collector foil 22*a* extends off from the separator sheets 31 and 32 at the opposite side in the width direction.

As illustrated in FIG. 1, the electrode body 20 described above is in a flat state along one flat surface including a winding axis so as to be housed in a case body 41*a* of the battery case 41. The non-formed portion 21*a*1 of the positive electrode current collector foil 21*a* is disposed along one side of the winding axis of the electrode body 20, and the non-formed portion 22*a*1 of the negative electrode current collector foil 22*a* is disposed along the opposite side of the winding axis of the electrode body 20.

<Battery Case 41>

As illustrated in FIG. 1, the battery case 41 houses the electrode body 20. The battery case 41 includes the case body 41a having a substantially rectangular parallelepiped shape whose one side surface has an opening, and a lid 41b attached to the opening. In this embodiment, from the viewpoint of obtaining weight reduction and required stiffness, each of the case body 41a and the lid 41b is made of aluminium or an aluminium alloy mainly containing aluminium.

<Case Body 41a>

As illustrated in FIGS. 1 and 2, the case body 41a has a rectangular parallelepiped shape whose one side surface has an opening. The case body 41a includes a substantially square bottom surface 61, a pair of wide faces 62 and 63, and a pair of narrow faces 64 and 65. Each of the pair of wide faces 62 and 63 rises from a longer side of the bottom surface 61. Each of the pair of narrow faces 64 and 65 rises from a shorter side of the bottom surface 61. One side surface of the case body 41a has an opening 41a1 surrounded by the pair of wide faces 62 and 63 and the pair of narrow faces 64 and 65.

<Lid 41b>

The lid 41b is attached to the opening 41a1 of the case body 41a surrounded by the longer sides of the pair of wide faces 62 and 63 and the shorter sides of the pair of narrow faces 64 and 65. A peripheral portion of the lid 41b is joined to the rim of the opening 41a1 of the case body 41a. This joint is preferably made by, for example, continuous welding without a gap. The welding can be performed by, for example, laser welding.

In this embodiment, the lid 41b is provided with the positive electrode terminal 42 and the negative electrode terminal 43. The positive electrode terminal 42 includes an inner terminal 42a and an external terminal 42b. The negative electrode terminal 43 includes an inner terminal 43a and an external terminal 43b. Each of the inner terminals 42a and 43a is attached to the inner side of the lid 41b with an insulator 72 interposed therebetween. Each of the external terminals 42b and 43b is attached to the outer side of the lid 41b with a gasket 71 interposed therebetween. Each of the inner terminals 42a and 43a extends inside the case body 41a. The inner terminal 42a of the positive electrode is connected to the non-formed portion 21a1 of the positive electrode current collector foil 21a. The inner terminal 43a of the negative electrode is connected to the non-formed portion 22a1 of the negative electrode current collector foil 22a.

As illustrated in FIG. 1, the non-formed portion 21a1 of the positive electrode current collector foil 21a and the non-formed portion 22a1 of the negative electrode current collector foil 22a of the electrode body 20 are attached to the inner terminals 42a and 43a respectively attached to both side portions of the lid 41b in the longitudinal direction. The electrode body 20 is housed in the battery case 41b while being attached to the inner terminals 42a and 43a attached to the lid 41b. In this embodiment, the electrode body 20 of a winding-type is employed as an example. The structure of the electrode body 20 is not limited to this type. The structure of the electrode body 20 may be a stacked structure in which positive electrode sheets and negative electrode sheets are alternately stacked with separator sheets interposed therebetween. A plurality of electrode bodies 20 may be housed in the battery case 41.

The battery case 41 may house an unillustrated electrolyte together with the electrode body 20. As the electrolyte, a nonaqueous electrolyte in which a supporting electrolyte is dissolved in a nonaqueous electrolyte. Examples of the non-aqueous solvent include carbonate-based solvents such as ethylene carbonate, dimethyl carbonate, and ethyl methyl carbonate. Examples of the supporting electrolyte include fluorine-containing lithium salt such as LiPF6.

Figure 3:
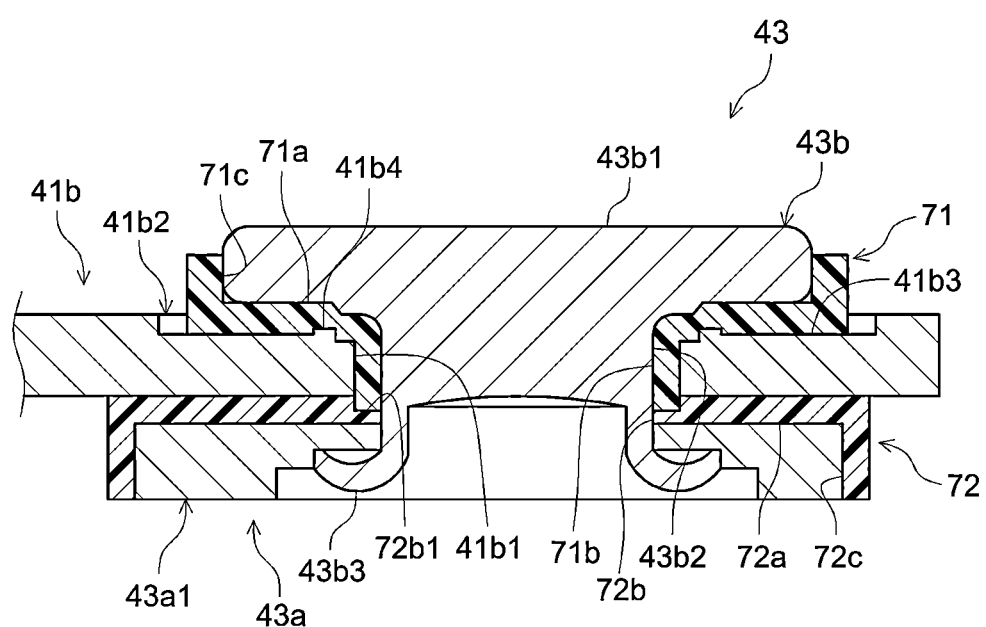
FIG. 3 is a cross-sectional view taken along line III-III in FIG. 2.

FIG. 3 is a cross-sectional view taken along line III-III in FIG. 2. FIG. 3 shows a cross section of a portion in which the negative electrode terminal 43 is attached to the lid 41b. In this embodiment, a member formed by joining different metals is used for the external terminal 43b of the negative electrode. FIG. 3 does not show, for example, a structure of different metals constituting the external terminal 43b and interfaces of different metals, and schematically illustrates a cross-sectional shape of the external terminal 43b.

As illustrated in FIG. 3, the lid 41b has an attachment hole 41b1 for attaching the external terminal 43b of the negative electrode. The attachment hole 41b1 penetrates the lid 41b at a predetermined position of the lid 41b. The inner terminal 43a and the external terminal 43b of the negative electrode are attached to the attachment hole 41b1 of the lid 41b with the gasket 71 and the insulator 72 interposed therebetween. A step 41b2 to which the gasket 71 is attached around the attachment hole 41b1 is provided at the outer side of the attachment hole 41b1. The step 41b2 has a seat surface 41b3 on which the gasket 71 is disposed. The seat surface 41b3 has a projection 41b4 for positioning the gasket 71.

Here, as illustrated in FIG. 3, the external terminal 43b of the negative electrode includes a head 43b1, a shaft 43b2, and a swaging strip 43b3. The head 43b1 is disposed outside the lid 41b. The head 43b1 is a substantially flat plate portion larger than the attachment hole 41b1. The shaft 43b2 is attached to the attachment hole 41b1 with the gasket 71 interposed therebetween. The shaft 43b2 projects downward from a substantially center portion of the head 43b1. As illustrated in FIG. 3, the swaging strip 43b3 is a portion to be swaged to the inner terminal 43a of the negative electrode inside the lid 41b. The swaging strip 43b3 extends from the shaft 43b2, is inserted in the lid 41b, and then is bent to be swaged on the inner terminal 43a of the negative electrode.

<Gasket 71>

As illustrated in FIG. 3, the gasket 71 is attached to the attachment hole 41b1 and the seat surface 41b3 of the lid 41b. In this embodiment, the gasket 71 includes a seat 71a, a boss 71b, and a side wall 71c. The seat 71a is attached to the seat surface 41b3 provided on the outer surfaced around the attachment hole 41b1 of the lid 41b. The seat 71a has a substantially flat surface in conformity with the seat surface 41b3. The seat 71a has a recess in accordance with the projection 41b4 of the seat surface 41b3. The boss 71b projects from the bottom surface of the seat 71a. The boss 71b has an outer shape along the inner surface of the attachment hole 41b1 so as to be attached to the attachment hole 41b1 of the lid 41b. The inner surface of the boss 71b serves as an attachment hole to which the shaft 43b2 of the external terminal 43b is attached. The side wall 71c rises upward from the periphery of the seat 71a. The head 43b1 of the external terminal 43b is attached to a portion of the gasket 71 surrounded by the side wall 71c.

The gasket 71 is disposed between the lid 41b and the external terminal 43b, and ensures insulation between the lid 41b and the external terminal 43b. The gasket 71 ensures hermeticity of the attachment hole 41b1 of the lid 41b. In view of this, it is preferable to use a material having high chemical resistance and high weather resistance. In this embodiment, PFA is used for the gasket 71. PFA is a copolymer of tetrafluoroethylene and perfluoroalkoxyethylene (tetrafluoroethylene-perfluoroalkylvinylether copolymer). A material for the gasket 71 is not limited to PFA.

<Insulator 72>

The insulator 72 is attached to the inner side of the lid 41b around the attachment hole 41b1 of the lid 41b. The insulator 72 includes a base 72a, a hole 72b, and a side wall 72c. The base 72a is disposed along the inner surface of the lid 41b. In this embodiment, the base 72a is a substantially flat-plate portion. The base 72a is disposed along the inner surface of the lid 41b, and has a size with which the base 72a can be housed in the case body 41a and does not extend out of the lid 41b. The hole 72b corresponds to the attachment hole 41b1. In this embodiment, the hole 72b is disposed in a substantially center portion of the base 72a. A side surface facing the inner surface of the lid 41b has a step 72b1 that is recessed around the hole 72b. The step 72b1 houses a front end of the boss 71b of the gasket 71 attached to the attachment hole 41b1 without interference. The side wall 72c extends downward from the peripheral portion of the base 72a. The base 72a houses a base 43a1 disposed at one end of the inner terminal 43a of the negative electrode. The insulator 72 is disposed inside the battery case 41, and thus, preferably has required chemical resistance. In this embodiment, PPS is used for the insulator 72. PPS is poly phenylene sulfide resin. The material for the insulator 72 is not limited to PPS.

The inner terminal 43a of the negative electrode includes the base 43a1 and a connection strip 43a2 (see FIGS. 1 and 2). The base 43a1 is attached to the base 72a of the insulator 72. In this embodiment, the base 43a1 has a shape in conformity with the inner side of the side wall 72c around the base 72a of the insulator 72. As illustrated in FIGS. 1 and 2, the connection strip 43a2 extends from one end of the base 43a1, and extends in the case body 41a to be connected to the non-formed portion 22a1 of the negative electrode of the electrode body 20.

In this embodiment, the gasket 71 is attached to the outer side of the lid 41b with the boss 71b attached to the attachment hole 41b1. The external terminal 43b is attached to the gasket 71. At this time, the shaft 43b2 of the external terminal 43b is inserted in the boss 71b of the gasket 71, and the head 43b1 of the external terminal 43b is disposed on the seat 71a of the gasket 71. The insulator 72 and the negative electrode terminal 43 are attached to the inner side of the lid 41b. Then, as illustrated in FIG. 3, the swaging strip 43b3 of the external terminal 43b is bent and swaged to the base 43a1 of the negative electrode terminal 43. The swaging strip 43b3 of the external terminal 43b and the base 43a1 of the negative electrode terminal 43 are preferably partially joined by metal joint in order to increase conductivity.

In the inner terminal 42a of the positive electrode of the lithium ion secondary battery 10, the required level of oxidation-reduction resistance is not higher than that in the negative electrode. From the viewpoint of required oxidation-reduction resistance and weight reduction, aluminium is used for the inner terminal 42a (see FIG. 1) of the positive electrode. On the other hand, in the inner terminal 43a of the negative electrode, the required level of the oxidation-reduction resistance is higher than that in the positive electrode. In view of this, copper is used for the inner terminal 43a of the negative electrode. From the viewpoint of weight reduction and cost reduction, aluminium or an aluminium alloy is used for the bus bar to which the external terminal 43b is connected.

Inventors of the present disclosure are considering that copper or a copper alloy is used for a portion of the external terminal 43b to be joined to the inner terminal 43a and aluminium alloy or an aluminium alloy is used for a portion of the external terminal 43b to be connected to the bus bar. With this structure, in the technique disclosed here, a member in which different metals of copper or a copper alloy and aluminium or an aluminium alloy are joined is used as the external terminal 43b. It is generally difficult to obtain sufficient joint strength in joining different metals. Thus, the inventors are considering increasing joint strength between these metals. A structure of a terminal part constituting the external terminal 43b of the negative electrode will be described together with a method for fabricating the terminal part.

<Terminal Part 200>

Figure 4:
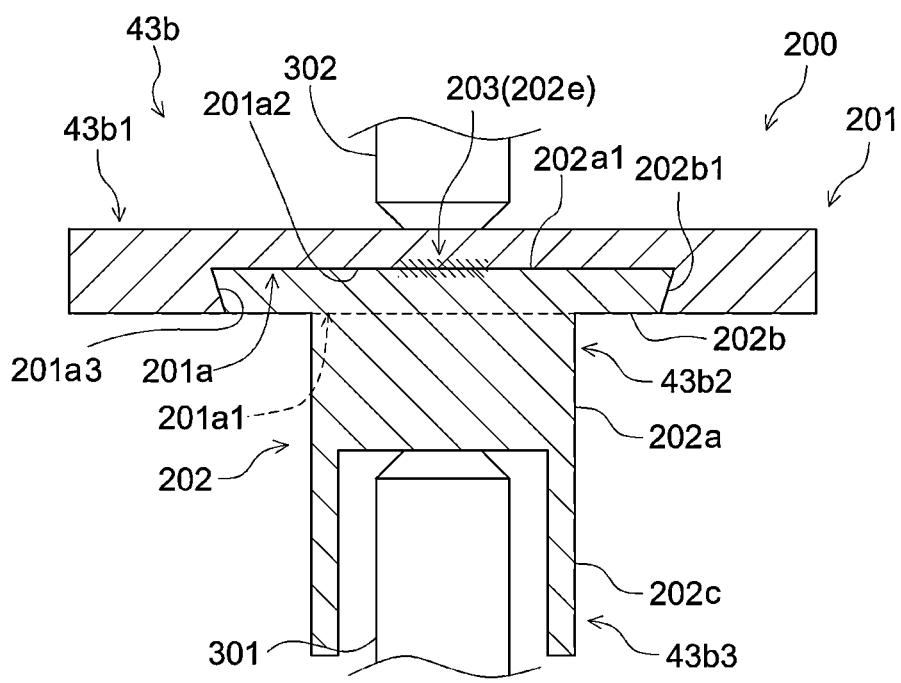
FIG. 4 is a cross-sectional view schematically illustrating a terminal part 200.

FIG. 4 is a cross-sectional view schematically illustrating the terminal part 200. The terminal part 200 can be used for the external terminal 43b of the negative electrode illustrated in FIG. 3. FIG. 4 schematically illustrates a structure of different metals and an interface between the different metals in the terminal part 200. FIG. 4 also schematically illustrates a process of joining a first metal 201 and a second metal 202 constituting the terminal part 200.

The terminal part 200 includes the first metal 201 and the second metal 202. A contact interface between the first metal 201 and the second metal 202 is at least partially joined, and a joint portion 203 joined by metal diffusion is formed. The first metal 201 is aluminium or an aluminium alloy. The second metal 202 is copper or a copper alloy. The "aluminium alloy" herein refers to an alloy in which at least 70% of the alloy is aluminium. The "copper alloy" herein refers to an alloy in which at least 50% of the alloy is copper. A purity of aluminium in the first metal 201 is, for example, 70% or more, and may be 80% or more, 90% or more, 95% or more, or 98% or more. Alternatively, the first metal 201 may be aluminium. A purity of copper in the second metal 202 is, for example, 70% or more, and may be 80% or more, 90% or more, 95% or more, or 98% or more. Alternatively, the second metal 202 may be copper. Other elements that can be included in the first metal 201 and the second metal 202 are not specifically limited, and examples of the elements include silicon (Si), iron (Fe), manganese (Mn), magnesium (Mg), zinc (Zn), chromium (Cr), titanium (Ti), lead (Pb), and zirconium (Zr).

Figure 5:
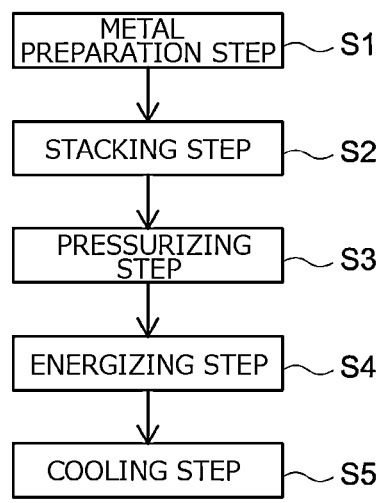
FIG. 5 is a flowchart schematically showing a method for fabricating the terminal part 200.

FIG. 5 is a flowchart schematically showing a method for fabricating the terminal part 200. The method for fabricating the terminal part 200 includes, for example, the following steps S1 through S5: a metal preparing step S1; a stacking step S2; a pressurizing step S3; an energizing step S4; and a cooling step S5.

<Metal Preparing Step S1>

In the metal preparing step S1, the first metal 201 and the second metal 202 are prepared. As illustrated in FIG. 4, the first metal 201 has a flat plate shape, and has a recess 201a. In this embodiment, a side surface 201a3 of the recess 201a is a tapered surface that tilts to gradually expand from an opening 201a1 toward a bottom portion 201a2. That is, the inside of the recess 201a is wider than the opening 201a1. The first metal can be prepared by performing known metal processing on an aluminium plate or an aluminium alloy plate.

In this embodiment, the second metal 202 includes a shaft 202a and a flange 202b extending radially outward from one end of the shaft 202a. An end surface 202a1 of the second metal 202 near the flange 202b has a substantially circular shape circular shape. An outer rim 202b1 of the flange 202b has a swaged portion to which the first metal 201 is swaged. In this embodiment, the outer rim 202b1 of the flange 202b to which the first metal 201 is swaged is tapered such that the outer diameter thereof gradually decreases from an end surface of the second metal 202 including the flange 202b toward the other end surface. The shaft 202a has a portion 202c to serve as a swaging strip 43b3 to be swaged to the inner terminal 43a at the opposite side to the side at which the flange 202b is provided.

In this embodiment, the second metal 202 has a joining portion 202e that is to be joined to the first metal 201. The joining portion 202e is not limited to a specific portion, and preferably includes the center of a surface (i.e., the end surface 202a1) facing the bottom portion 201a2 of the first metal 201.

The second metal 202 is disposed toward the inside of the battery case 41 in the terminal part 200, and constitutes a portion to be joined to the inner terminal 43a of the negative electrode. A portion of the terminal part 200 (specifically the second metal 202) in which a portion constituted by at least copper is exposed may be appropriately provided with a nickel film. The presence of the nickel film prevents copper damage as appropriate. The nickel film may be formed by, for example, plating.

<Stacking Step S2>

In the stacking step S2, the first metal 201 and the second metal 202 are stacked. In this embodiment, a part of the second metal 202 (specifically the flange 202b) is caused to enter the recess 201a of the first metal 201 so that the first metal 201 and the second metal 202 are mechanically joined together. For example, a required pressing pressure is applied using, for example, a pressing machine with the first metal 201 stacked on the end surface 202a1 of the second metal 202. At this time, the first metal 201 is plastically deformed, and a portion of the second metal 202 including the flange 202b enters the recess 201a. As illustrated in FIG. 4, the end surface 202a1 of the second metal 202 is housed in the recess 201a of the first metal 201. The first metal 201 and the second metal 202 have a so-called swaging structure. The mechanical joint between the first metal 201 and the second metal 202 described above obtains a high joint strength between the first metal 201 and the second metal 202.

<Pressurizing Step S3>

In the pressurizing step S3, a pressure is applied to a stacked portion of the first metal 201 and the second metal 202. This pressurization locally increases resistance of the stacked portion. The stacked portion is, for example, a portion in which the bottom portion 201a2 of the recess 201a of the first metal 201 is stacked on the end surface 202a1 of the second metal 202. In this embodiment, so-called resistance welding is performed. The resistance welding joins the contact interface between the first metal 201 and the second metal 202 by diffusion of metals. As illustrated in FIG. 4, the stacked portion of the first metal 201 and the second metal 202 is sandwiched between electrodes 301 and 302. At this time, the stacked portion is subjected to a predetermined pressure with the electrode 302 being in contact with the first metal 201 and the electrode 301 being in contact with the second metal 202. The pressure at this time can be 4 N/mm$^2$ or more and 50 N/mm$^2$ or less (4 MPa to 50 MPa), and is, for example, preferably 5 N/mm$^2$ or more and 30 N/mm$^2$ or less (5 MPa to 30 MPa) and more preferably 10 N/mm$^2$ or more and 20 N/mm$^2$ or less (10 MPa to 20 MPa).

<Energizing Step S4>

In the energizing step S4, the first metal 201 and the second metal 202 are energized while being subjected to the pressure as described above. Specifically, the electrode 301 and the electrode 302 that have been brought into contact with the first metal 201 and the second metal 202 as described above are energized.

In this embodiment, the energizing step S4 includes a first energizing step of causing a current Ia to flow and a second energizing step of causing a current Ib to flow. The currents Ia and Ib can be set in the range from 5 kA to 15 kA. The current Ia is preferably smaller than the current Ib, and current Ia can be 8 kA to 10 kA and the current Ib can be 10 kA to 12 kA, for example. The total energization time is not specifically limited, and can be, for example, 5 milliseconds or more and 250 milliseconds or less, and is preferably 20 milliseconds or more and 200 milliseconds or less. In the first energizing step, the total energization time can be 30 milliseconds or more and 70 milliseconds or less. In the second energizing step, the total energization time can be 50 milliseconds or more and 200 milliseconds or less, and is preferably 80 milliseconds or more and 120 milliseconds or less. By performing the pressurizing step S3 and the energizing step S4 under predetermined conditions, heat is generated at the contact interface between the first metal 201 and the second metal 202 so that melting and diffusion of aluminium and copper can be rapidly caused.

<Cooling Step S5>

In the cooling step S5, the contact interface between the first metal 201 and the second metal 202 is cooled. In this embodiment, after a lapse of a predetermined time from the start of energization in the step S4, the energization is stopped. When the energization is stopped, an energization path is cooled. Through the energizing step S4, the joint portion 203 is formed. In stopping the energization, the pressurization is preferably stopped. In this manner, the terminal part 200 can be fabricated.

Figure 6:
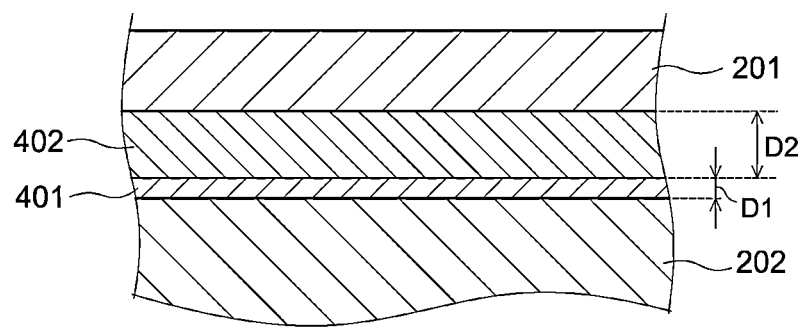
FIG. 6 is a partially enlarged cross-sectional view of a joint portion 203.

FIG. 6 is a partially enlarged cross-sectional view of the joint portion 203. As illustrated in FIG. 6, in the joint portion 203, the joint interface between the first metal 201 and the second metal 202 includes a first layer 401 containing a first intermetallic compound disposed at the second metal 202 and constituted by aluminium and copper and a second layer 402 disposed closer to the first metal 201 than the first layer 401 and containing a second intermetallic compound different from the first intermetallic compound constituted by aluminium and copper.

Here, in the second layer 202, the second intermetallic compound has grown in a dendritic pattern (see a portion indicated by 401 in, for example, FIGS. 8 through 12). Aluminium or an aluminium alloy constituting the first metal 201 is present in a gap of the dendritic second intermetallic compound. In the manner described above, the presence of the first metal 201 in the gap increases joint strength of the joint portion between the first metal 201 and the second metal 202 as different metals.

In this embodiment, the content of aluminium in the second intermetallic compound is larger than the content of aluminium in the first intermetallic compound. The first intermetallic compound can be $Cu_9Al_4$. The second intermetallic compound can be $CuAl_2$. This can be confirmed by analyzing an atomic ratio in a cross section of the joint portion 203 with, for example, crystal analysis using X-ray diffraction (XRD), energy dispersive X-ray spectroscopy (EDS(EDX)), or an electron probe micro analyzer (EPMA). To perform the analysis, commercially available analysis apparatus or analysis software can be used without any particular limitation.

The first layer 401 has a thickness D1 exceeding 1 μm. The thickness D1 of the first layer 401 is not specifically limited, and can be 30 μm or less (e.g., 20 μm or less). The second layer 402 has a thickness D2 exceeding 1 μm. In this embodiment, the thickness D2 of the second layer 402 is larger than the thickness D1 of the first layer 401. Accordingly, preferable joint strength can be obtained between the first metal 201 and the second metal 202. The thickness D2 of the second layer 402 is, for example, 10 µm to 500 µm, and can be 300 µm or less, 250 µm or less, or 200 µm or less, depending on the conditions of pressurization and energization.

In this embodiment, supposing the thickness D1 of the first layer 401 is 1, the thickness D2 of the second layer 402 is 1 or more, and generally 30 or less. To obtain preferable joint strength between the first metal 201 and the second metal 202, the thickness D2 of the second layer 402 is preferably 1 or more and 5 or less, where the thickness D1 of the first layer 401 is 1. That is, the ratio of the thickness D2 to the thickness D1 (D2/D1) is 1 or more and generally 30 or less, and is preferably 1 or more and 5 or less.

The thickness of each of the first layer 401 and the second layer 402 can be measured from a scanning electron microscope (SEM) observation image. As an example, a cross section observation image of the joint portion 203 is acquired by SEM so that the thickness of each layer is measured using commercially available image analysis software. The thickness of each layer is measured at a plurality of (5 or more, 10 or more, 15 or more, or 20 or more) points, and an arithmetic mean thereof is obtained so that the thickness D1 of the first layer 401 and the thickness D2 of the second layer 402 are obtained.

Mechanisms of forming the first layer 401 and the second layer 402 are not specifically limited, and the inventors assume the mechanisms as follows (see FIGS. 4 and 6). Since the joining portion 202e is a contact interface between different meals of aluminium (first metal 201) and copper (second metal 202), this contact interface is a high-resistance region in low-resistance welding. When this region is energized, heat is generated in the joining portion 202e because of high resistance of this region. When the heat generation causes the temperature to reach a melting point, aluminium melts to be diffused to copper. When the heat generation continues, copper melts to be diffused to aluminium. Since the melting point of aluminium is lower than the melting point of copper, the melting amount of aluminium is relatively large, and the melting amount of copper becomes relatively small. When energization is completed, heat is diffused to the air and parts, and thus, the temperature of the joining portion 202e rapidly decreases. At this time, aluminium and copper melted and diffused as described above are precipitated in a dendritic pattern as intermetallic compounds. Effects obtained by formation of the first layer 401 and the second layer 402 are not specifically limited. The inventors of the present disclosure assume that entering of relatively soft aluminium (first metal) into gaps of the relatively hard dendritic second layer 402 (second intermetallic compound) can absorb a possible external load applied to the joint portion 203 by vibrations or an impact. The inventors* of the present disclosure expect that this absorption increases joint strength of the joint portion 203 between the first metal 201 and the second metal 202 as different metals.

In addition, as described above, rapid cooling hinders uniform diffusion of aluminium and copper and generates intermetallic compounds (e.g., $CuAl_2$ and $Cu_9Al_4$) having different compositions. In this manner, the second layer 402 containing the aluminium-rich second intermetallic compound (e.g., $CuAl_2$) is formed at the first metal 201 (aluminium), and the first layer 401 containing the copper-rich first intermetallic compound (e.g., $Cu_9Al_4$) is formed at the second metal 202 (copper). Formation of the first layer 401 obtains the effect of increasing conductivity of the interface between the first metal 201 (aluminium) and the second metal (copper). When the content of aluminium in the second intermetallic compound is larger than the content of aluminium in the first intermetallic compound, the first metal (aluminium) enters between dendrite portions so that hard dendrite serves as knots, and a structure resistant to distortion can be obtained. Since $CuAl_2$ has a low conduction resistance, if the second intermetallic compound is $CuAl_2$, the effect of increasing conductivity is obtained. In addition, $Cu_9Al_4$ has a high hardness, if the first intermetallic compound is $Cu_9Al_4$, the effect of increasing strength is obtained.

In the secondary battery 100 including the battery case 41 and the electrode terminals 42 and 43 attached to the battery case 41, the electrode terminals 42 and 43 may include portions constituted by the terminal part 200. As described above, in the terminal part 200, joint strength of the joint portion 203 is enhanced. Thus, it is possible to provide a secondary battery having enhanced joint strength of a joint portion between different metals.

EXAMPLES

Some examples relating to the present disclosure will now be described, but the present disclosure is not intended to be limited to these examples. Characters used in the following description refer to those in FIG. 4 as appropriate.

<1. Preparation of Sample>

As the first metal 201, a plate-shaped aluminium member (purity: 99.5%) having a cross section shown in FIG. 4 was prepared. As the second metal 202, a copper member (purity: 99.5%) having a cross section shown in FIG. 4 was prepared. These members were mechanically joined in the steps described above.

<2. Fabrication of Terminal Part>

First Example

The electrode 302 and the electrode 301 were respectively brought into contact with the first metal 201 and the second metal 202 of a sample prepared as described above, and a pressure of 15 N/mm$^2$ was applied to a portion in which the first metal 201 and the second metal 202 were stacked (pressurizing step). Next, under the application of the pressure, the first metal 201 and the second metal 202 were energized with a current Ia of 8 kA for 50 milliseconds (first energizing step). Then, energization was performed with a current Ib of 10.5 kA for 100 milliseconds (second energizing step). Thereafter, energization was stopped (cooling step). In this manner, a terminal part according to the first example was fabricated.

Second Through Fourth Examples

Terminal parts according to examples were fabricated using the same materials and the same steps as those of the first example except that the current Ia and the energization time in the first energizing step and the current Ib and the energization time in the second energizing step shown in Table 1 were employed.

Fifth and Sixth Examples

No first energizing step was performed. The current Ib and the energization time in the second energizing step shown in Table 1 were employed. Except for those items, terminal parts according to the fifth and sixth examples were fabricated using the same materials and the same steps. The symbol "-" in "first energizing step" in Table 1 means that the step was not performed.

Seventh Example

A terminal part according to a seventh example was fabricated using the same material and the same step as those shown in the first example except that the pressure in the pressurizing step was 4.5 N/mm².

<3. Observation of Joint Interface>

Figure 7:
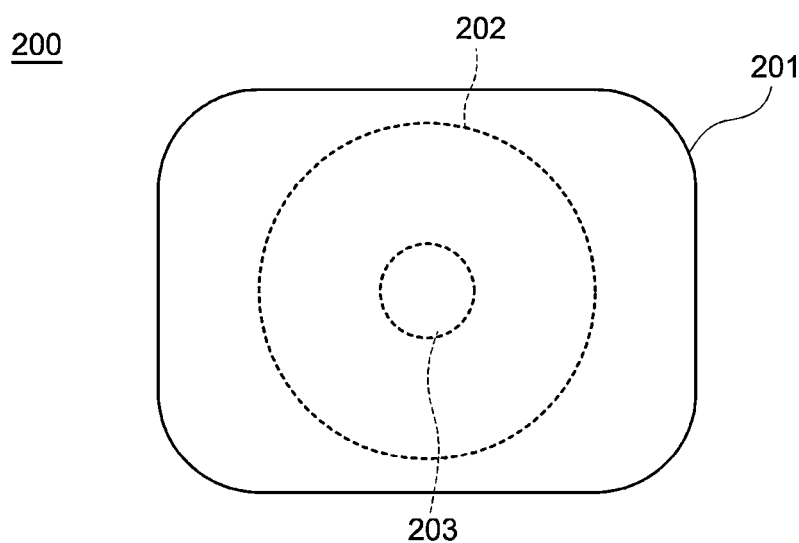
FIG. 7 is a plan view of the terminal part 200.
Figure 8:
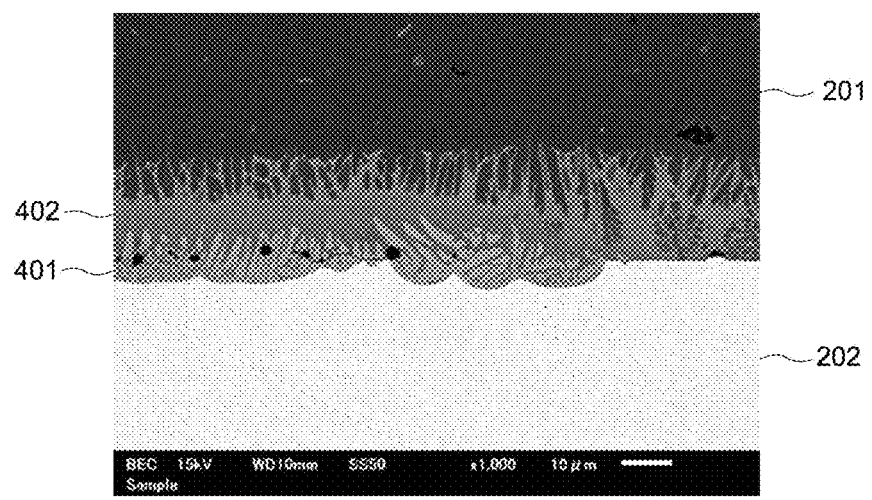
FIG. 8 is an SEM observation image of a first example.
Figure 9:
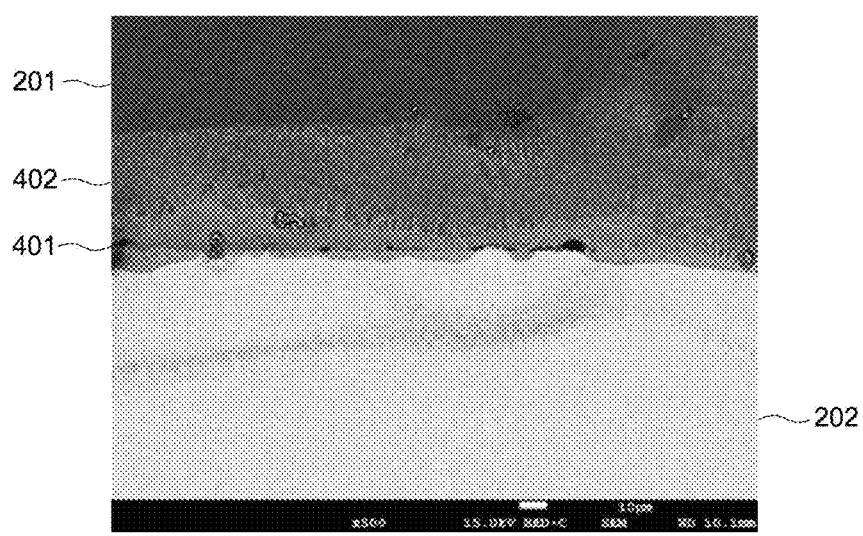
FIG. 9 is an SEM observation image of a second example.
Figure 10:
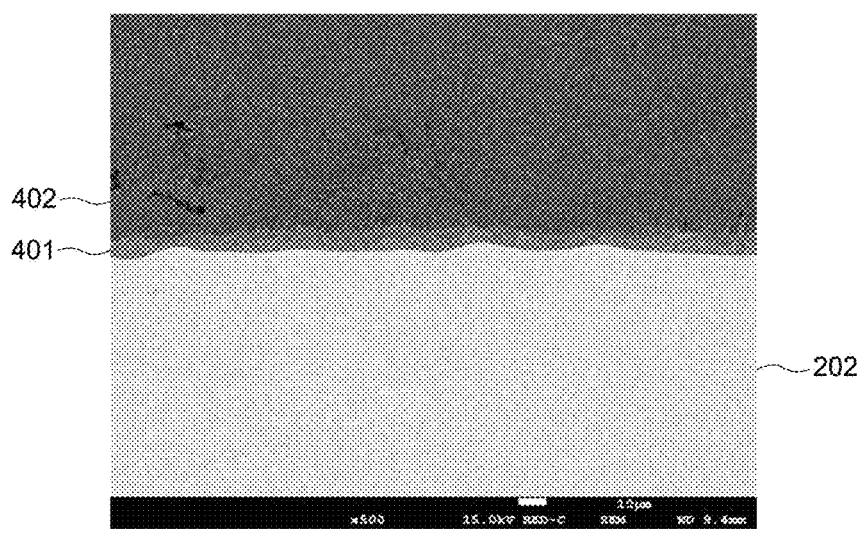
FIG. 10 is an SEM observation image of a third example.
Figure 11:
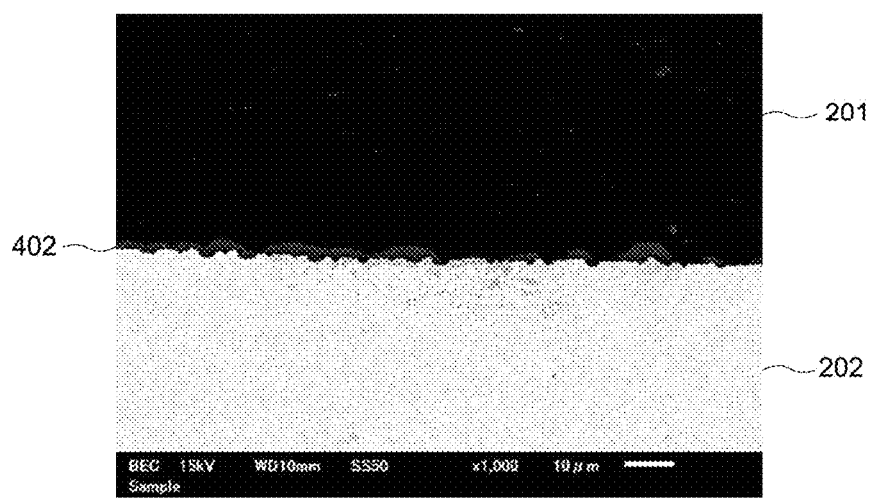
FIG. 11 is an SEM observation image of a fifth example.
Figure 12:
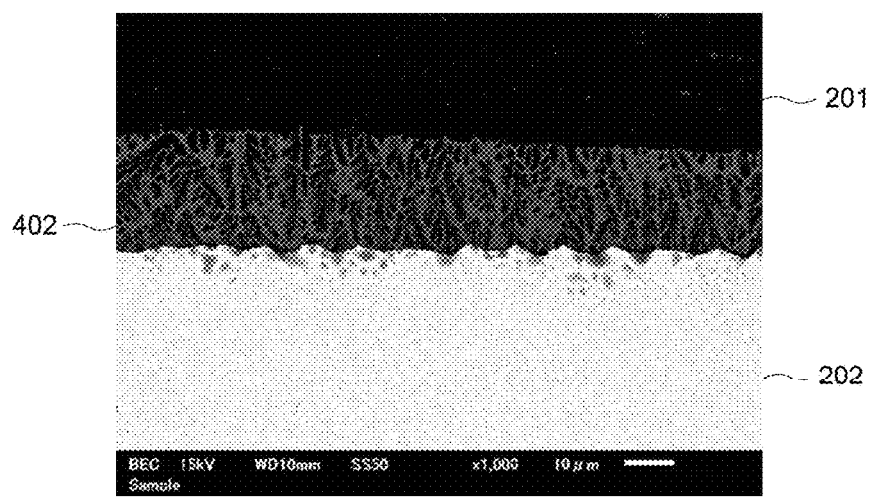
FIG. 12 is an SEM observation image of a sixth example.

For the terminal parts of the examples, samples for cross-sectional SEM observation of the joint interface between the first metal 201 and the second metal 202 were prepared. FIG. 7 is a plan view of the terminal part 200. To prepare the samples, the terminal parts of the examples were first embedded in a resin and polished. Then, to enable observation of a cross section of the joint portion 203 between the first metal 201 and the second metal 202 in the terminal part 200 shown in FIG. 7, observation samples were prepared. Using the thus-obtained samples, SEM observation images were acquired. FIGS. 8 through 12 show typical images. FIG. 8 is an SEM observation image of the first example. FIG. 9 is an SEM observation image of the second example. FIG. 10 is an SEM observation image of the third example. FIG. 11 is an SEM observation image of the fifth example. FIG. 12 is an SEM observation image of the sixth example. The scale bar in each drawing indicates 10 μm. With respect to reference numeral in FIGS. 8 through 12, 201 denotes a first metal, 202 denotes a second metal, 401 denotes a first layer, and 402 denotes a second layer.

Thickness Measurement of Layered Structure

Using the SEM observation images obtained as described above, the thicknesses of the first layer 401 and the second layer 402 (see FIG. 6) were obtained as described above. From the measured thicknesses of the layers, the thickness of the second layer 402 assuming that the thickness of the first layer 401 is 1 (i.e., the ratio of thickness D2 to thickness D1 (D2/D1)) was calculated. The results are shown in Table 1. The symbol "-" in "thickness (μm)" of the "first layer" in Table 1 represents that the first layer had a thickness of 1 μm or less, and "-" in "ratio (D2/D1)" represents that the ratio was not calculated.

Composition Analysis

Using the samples described above, element mapping was performed by EDS, and compositions of the layers were analyzed from the ratios of a copper element and an aluminium element in an SEM observation field. As an EDS device, an EDS device manufactured by JEOL Ltd. was used. Results are shown in "Composition" in Table 1.

Measurement of Joint Strength

For the terminal parts according to the examples, a joint strength between the first metal 201 and the second metal 202 was measured. For the measurement of a joint strength, a commercially available tensile test machine was used. Portions 202c to be swaging strips of the first metal 201 and the second metal 202 were held by a clamp of the tensile test machine (see FIG. 4). Then, the first metal 201 and the second metal 202 were stretched away from each other by the tensile test machine, and a strength at which joint portions of the first metal 201 and the second metal 202 were broken was measured as a joint strength (N). Results are shown in "Joint Strength (N)" of Table 1. As the numerical value of this item increases, the joint strength increases. In this embodiment, if the value is 10 N or more, it is evaluated that "the joint strength is high."

TABLE 1

| | Pressurizing Step | First Energizing Step | | Second Energizing Step | | First Layer | | Second Layer | | | Joint |
|---|---|---|---|---|---|---|---|---|---|---|---|
| | Load (N/mm²) | Ia (kA) | Time (millisecond) | Ib (kA) | Time (millisecond) | Thickness (μm) | Composition | Thickness (μm) | Composition | D2/D1 | Strength (N) |
| Example 1 | 15 | 8 | 50 | 10.5 | 100 | 10 | Cu₉Al₄ | 15 | CuAl₂ | 1.5 | 52.3 |
| Example 2 | 15 | 8 | 50 | 11.0 | 100 | 10 | | 50 | | 5 | 20.5 |
| Example 3 | 15 | 10 | 50 | 10.5 | 100 | 10 | | 200 | | 20 | 18.3 |
| Example 4 | 15 | 10 | 50 | 10.5 | 200 | 15 | | 450 | | 30 | 10.6 |
| Example 5 | 15 | — | | 10.0 | 100 | — | | 3 | | — | 5.5 |
| Example 6 | 15 | — | | 10.5 | 100 | — | | 15 | | — | 4.2 |
| Example 7 | 4.5 | 8 | 50 | 10.5 | 100 | — | | 8 | | — | 5.0 |

As shown in Table 1 and FIGS. 8 through 12, it was observed that in the terminal parts (first through fourth examples) each including the first metal of aluminium or an aluminium alloy and a second metal of copper or a copper alloy, where the joint interface between the first metal and the second metal includes the first layer disposed at the second metal and containing the first intermetallic compound constituted by aluminium and copper and the second layer disposed closer to the first metal than the first layer and containing the second intermetallic compound constituted by aluminium and copper and different from the first intermetallic compound, in the second layer, the second intermetallic compound has grown in a dendritic pattern, and aluminium or an aluminium alloy is present in a gap in the dendritic second intermetallic compound, joint strength of the joint portion between the first metal and the second metal as different metals is higher than those in the fifth through seventh examples including no first layer.

Specific examples of the technique disclosed here have been described in detail hereinbefore, but are merely illustrative examples, and are not intended to limit the scope of claims. The invention disclosed here includes various modifications and changes of the above specific examples.

What is claimed is:

1. A terminal part comprising:
   a first metal of aluminium or an aluminium alloy; and
   a second metal of copper or a copper alloy,
   wherein
   a joint interface between the first metal and the second metal comprises
      a first layer disposed at the second metal and containing a first intermetallic compound constituted by aluminium and copper, and a second layer disposed closer to the first metal than the first layer and containing a second intermetallic compound, the second intermetallic compound being different from the first intermetallic compound and constituted by aluminium and copper, and in the second layer, the second intermetallic compound has grown in a dendritic pattern, and aluminium or an aluminium alloy constituting the first metal is present in a gap of the second intermetallic compound having the dendritic pattern.

2. The terminal part according to claim 1, wherein a content of aluminium in the second intermetallic compound is larger than a content of aluminium in the first intermetallic compound.

3. The terminal part according to claim 1, wherein a thickness of the second layer is larger than a thickness of the first layer.

4. The terminal part according to claim 1, wherein the thickness of the first layer is 1, and the thickness of the second layer is 1 or more and 5 or less.

5. The terminal part according to claim 1, wherein the second intermetallic compound is $CuAl_2$.

6. The terminal part according to claim 1, wherein the first intermetallic compound is $Cu_9Al_4$.

7. A secondary battery comprising:
an electrode body comprising a positive electrode and a negative electrode;
a battery case configured to house the electrode body;
a positive electrode terminal attached to the positive electrode; and
a negative electrode terminal attached to the negative electrode, wherein
at least one of the positive electrode terminal or the negative electrode terminal comprises the terminal part according to claim 1.

8. A method for fabricating a terminal part, the method comprising:

a stacking step of stacking a first metal of aluminium or an aluminium alloy and a second metal of copper or a copper alloy;
a pressurizing step of applying a pressure to stacked portions of the first metal and the second metal; and
an energizing step of energizing the first metal and the second metal under application of the pressure,
wherein
through the energizing step, two layers of
a first layer disposed at the second metal and containing a first intermetallic compound constituted by aluminium and copper, and
a second layer disposed closer to the first metal than the first layer and containing a second intermetallic compound, the second intermetallic compound being constituted by aluminium and copper and different from the first intermetallic compound,
are formed at a joint interface between the first metal and the second metal, and
in the second layer, the second intermetallic compound has grown in a dendritic pattern, and aluminium or an aluminium alloy constituting the first metal is present in a gap of the second intermetallic compound having the dendritic pattern.

9. The method according to claim 8, wherein a content of aluminium in the second intermetallic compound is larger than a content of aluminium in the first intermetallic compound.

10. The method according to claim 8, wherein the energizing step comprises a first energizing step of causing a current Ia to flow and a second energizing step of causing a current Ib to flow, and the current Ia is smaller than the current Ib.

11. The method according to claim 8, wherein a total energization time in the energizing step is 20 milliseconds or more and 200 milliseconds or less.

12. The method according to claim 8, wherein the pressure is 5 $N/mm^2$ or more and 30 $N/mm^2$ or less.

* * * * *